United States Patent [19]
Klassen

[11] Patent Number: 5,635,967
[45] Date of Patent: Jun. 3, 1997

[54] IMAGE PROCESSING METHOD TO REDUCE MARKING MATERIAL COVERAGE IN PRINTING PROCESSES

[75] Inventor: R. Victor Klassen, Webster, N.Y.

[73] Assignee: Xerox Corporation, Stamford, Conn.

[21] Appl. No.: 291,371

[22] Filed: Aug. 15, 1994

[51] Int. Cl.$^6$ ............................ B41J 2/21; B41J 2/205
[52] U.S. Cl. ......................................... 347/43; 347/15
[58] Field of Search ........................ 347/43, 15, 100, 347/19; 358/298, 458, 459

[56] References Cited

U.S. PATENT DOCUMENTS

| | | | |
|---|---|---|---|
| 4,638,337 | 1/1987 | Torpey et al. . | |
| 4,774,530 | 9/1988 | Hawkins . | |
| 4,930,018 | 5/1990 | Chan et al. . | |
| 4,999,646 | 3/1991 | Trask . | |
| 5,237,344 | 8/1993 | Tasaki et al. . | |
| 5,252,995 | 10/1993 | Trask et al. . | |
| 5,339,171 | 8/1994 | Fujisawa et al. | 358/458 |
| 5,387,976 | 2/1995 | Lesniak | 347/100 |
| 5,428,377 | 6/1995 | Stoffel et al. | 347/15 |
| 5,469,267 | 11/1995 | Wang | 358/459 |

FOREIGN PATENT DOCUMENTS

91/14578  3/1991  WIPO .

OTHER PUBLICATIONS

Patent Abstracts of Japan, vol. 14, No. 583, (M–1064) Dec. 26, 1990 & JP–A–02253958; (Canon) Oct. 12, 1990.
Patent Abstracts of Japan, vol. 18, No. 470 (E–1600) Oct. 30, 1992 & JP–A–06152902, (Canon) May 31, 1994.
J.A.C. Yule; "Principles of Color Reproduction"; J. Wiley & Sons, 1967.
Klassen; "Reducing Ink Coverage Levels in Binary CMYK Images"; Proc. Soc. Imaging Science & Technology; 46th Annual Conference; May 1993.

Primary Examiner—Benjamin R. Fuller
Assistant Examiner—Thinh Nguyen
Attorney, Agent, or Firm—Mark Costello

[57] ABSTRACT

A method and apparatus for reducing marking material coverage in reproduction of edges in a halftoned image, includes the steps of: a) detecting edges in the image using edge filtering; and b) reducing marking material coverage at the detected edges. Interseparation correlation may also be provided, for the purpose of ascertaining whether a detected edge is against a white or no colorant region, in which circumstance, marking material coverage is not reduced. Further described is the reduction of marking material coverage at the detected edges in proportion to the overall coverage in the image region, taking into account the kind of colors (primary, secondary) forming the edge.

15 Claims, 5 Drawing Sheets

IMAGE PROCESSING METHOD TO REDUCE MARKING MATERIAL COVERAGE IN PRINTING PROCESSES

This invention relates to an image processing method for reducing the amount of marking material required to print a colored image, to avoid problems common to the use of excessive amounts of ink.

CROSS REFERENCE

Cross Reference is made to U.S. patent application Ser. No. 07/917,643 to Klassen filed Jul. 23, 1992; U.S. patent application Ser. No. 08/158,874 to Klassen filed Nov. 29, 1993; U.S. patent application Ser. No. 08/208,556 to Klassen et al. filed Mar. 10, 1994.

BACKGROUND OF THE INVENTION

Full color printing has become a desired goal of office products. One type of full color printer which has significant potential for fulfilling such a goal is the ink jet printer. In one common design of such printers, a reservoir of liquid ink is connected to an ink output orifice via a capillary tube. In the tube, a heater element is provided, responsive to an on/off or binary printing signal. When printing is required and a printing signal is directed to the heater element, the heater element rapidly heats ink in the capillary tube adjacent thereto to a gaseous state, producing a pressure differential which expels a droplet of ink from the orifice, directing the droplet to a sheet of receiving material, such as paper. Color printing is accomplished by providing multiple layers or separations of ink on the page. Commonly, colors are provided by subtractive combinations of cyan, magenta and yellow inks. To print black, a combination of equal amounts of cyan, magenta and yellow is printed, or a fourth black ink is used as a substitute. Under color removal, a well known process in the printing arts, can be used to print a single layer of black ink as a substitute for the combination of equal amounts of cyan, magenta and yellow. For a fuller discussion of under color removal and its application to electronically derived or created images, reference is made to J. A. C. Yule, *Principles of Color Reproduction*, (John Wiley & Sons, Inc., New York, 1967), pages 294– 327. Other full color printing processes may use dry powder or liquid toners.

A problem of ink jet printers is that the liquid inks used have a finite drying time, which tends to be somewhat longer than desirable. Further, the drying time of any particular area is at least partly a function of the amount of ink deposited on that area. While satisfactory drying times are possible with black-only or single separation printing, once multiple separations are required, the large amount of liquid on the page causes the problems of ink puddling or pooling, bleeding to adjacent image areas, and flow through to the back side of the receiving material. Intercolor bleeding is particularly noted in the printed image at high ink coverage areas, and high coverage areas where high contrast image edges occur. While certain materials variations, such as different inks or special papers may resolve some of these problems, each brings its own distinct problems to the process. Transparencies present particular problems in this regard.

While transparencies have been designed to accept ink jet inks, it is not uncommon that coverage is limited to less than 100% coverage to prevent bleeding, or other artifacts resulting from too much ink. As used herein, ink coverage refers to the number of ON pixels in a region for all the separations, divided by the total number of pixels in the region in one separation. Without undercolor removal, a typical full color image may require ink coverage in the range of 200–300%. With undercolor removal, maximum ink coverage may be down to 200%, but no lower.

For cost reasons, it is highly desirable for any process to operate irrespective of image content, or on the separation binary bitmaps without further image information. That is, the process should be able to work on any type of image, whether it contain text, graphics, or a halftoned image, without being informed of which portions contain text or halftoned images, or graphics.

Tasaki et al. (U.S. Pat. No. 5,237,344) describe a method for reducing the amount of ink printed to 50%, 75% or 66%. The method uses fixed patterns of turn-off locations (e.g., a checkerboard for 50%) and selects the pattern based on the printing mode (reverse character mode, block graphic mode or normal character mode), the character selected, and possibly the relative humidity. Apparently, the method is designed for single color (black) printing: if it were used for multiple separation (e.g., red formed from yellow and magenta) printing, both separations would be turned off in the same place, resulting in more obvious patterns. The small set of fixed turn-off patterns makes the method very sensitive to line angle, as lines at some angles will have more pixels turned off than others. Also the method is only useful for characters from a built-in font, including graphic characters: arbitrary fonts and shapes, such as are requested in documents created using industry standard page description languages e.g., PCL or PostScript, cannot be handled in this way. U.S. Pat. No. 4,930,018 to Chan et al. teaches the reduction of paper cockle and graininess of ink jet prints. Printing of a given scan line occurs multiple times, with three different dye loadings, with pixels requiring the highest dye loading printed on one pass, pixels requiring an intermediate dye loading printed on another pass, and pixels requiring the lowest dye loading on another pass. The method takes as input continuous tone RGB (red-green-blue) images and performs RGB-CMYK (cyan-magenta-yellow key or black) conversion with full under color removal. As understood, printing is performed at half resolution, so that "pixels" in the input image correspond to 2×2 blocks in the output image. The image data is first error diffused from 8 bits per pixel per separation to 4 bits pixel per separation. Then, for each pixel, a count of up to 4 drops of each dye loading is computed, for each separation. There are multiple choices, ranked in order of total ink coverage. If the highest coverage choice exceeds the maximum allowable coverage, the separation with highest coverage is changed to use a lower coverage value for the same gray level, if possible. If it is not possible to stay at the same gray level, the gray level for that separation is dropped by one, and the error passed on to neighbors. The process iterates until the total ink coverage is as low as required. Pixels within the 2×2 block are assigned values (0 or 1) by proceeding around the block in clockwise order, and filling in pixels in order. First, the high dye load pixels are turned on, then the medium, then the low. Within each dye loading group, first black is turned on, until there are no more black pixels of that dye loading, then the next pixels in the cycle are cyan, until there are no more cyan required, then magenta, and yellow, and then the next dye load group. By maximizing ink coverage and using multiple dye loadings, they reduce the noisiness of the image, and by maintaining the total ink coverage within known limits, they prevent the many problems associated with excessive ink.

U.S. Pat. No. 4,999,646 to Trask teaches limiting coverage to 100% coverage (by the above definition of coverage), or perhaps between 100 and 200% coverage (if 100% corresponds exactly to no white spaces on a page), owing to the circular shape and overlap of print dots. Coverage is limited by using 2×2 super pixels and assigning each one drop per pixel in a combination that depends on the color required. Assuming one bit per separation input with full undercolor removal, there are eight possible colors that could be requested (including white). In order to reduce patterning due to the multiple swaths, two passes are used, each of a checkerboard pattern of pixels (the two passes being offset to provide full coverage). The two pass process allows ink to dry between passes.

While the method taught in U.S. patent application Ser. No. 07/917,643 by Klassen, filed Jul. 23, 1992, reduces ink coverage in business graphics including heavily saturated regions of continuous tone images (see also, Klassen, "Reducing Ink Coverage Levels in Binary CMYK Images", Proc. Soc. Imaging Science and Technology, 46th Annual Conference (May, 1993), pp. 173–175, and for example, EP-A1-580376,), it leaves all but the boldest text and line art unchanged, except where they are on a colored background of sufficient density. Thus, areas of text with heavy ink coverage, for example the secondary colors formed by combining the primary colorants cyan, magenta yellow and black, which are commonly used to generate red, green or blue text, are observed to bloom significantly compared to black. Because these colors are the three most popular text colors after black, a method to reduce blooming in these colors in text areas is desirable. U.S. patent application Ser. No. 08/158,874 to Klassen filed Nov. 29, 1993, and U.S. patent application Ser. No. 08/208,556 to Klassen filed Mar. 10, 1994, also operate on an image to reduce marking material coverage. These methods do not treat edges between colors where bleeding may occur differently from interiors.

The references cited herein are hereby incorporated by reference for the teachings.

SUMMARY OF THE INVENTION

In accordance with the invention, there is provided a method for reducing the amount of marking material used in a printer, particularly reducing marking material coverage at image edges within an image, while minimally affecting the appearance of color in printed images.

In accordance with one aspect of the invention,there is provided a method of reducing marking material coverage in reproduction of edges in a halftoned image, including the steps of a) detecting edges in the image using edge filtering; and b) reducing marking material coverage at the detected edges.

In accordance with another aspect of the invention, the process is simplified by a) generating a contone approximation of the halftone image; and b) operating on the contone approximation to detect edges.

In accordance with yet another aspect of the invention, the method described includes a step of interseparation correlation, operating on the halftoned color image, for the purpose of ascertaining whether a detected edge is against a white or no colorant region, in which circumstance, marking material coverage is not reduced.

In accordance with still another aspect of the invention, the method described includes a step of reducing marking material coverage at the detected edges in proportion to the overall coverage in the image region, and includes the substeps of determining the kind of colors (primary, secondary) forming the edge, and based on such determination, selecting a tone reproduction curve (TRC) for the edge area which is optimized for reproduction of that edge, providing a larger or smaller white space between colors.

For some ink and receiving material combinations, it is necessary to reduce coverage substantially more at such boundaries in order to prevent intercolor bleed without seriously harming image quality. One possible solution to the problem of bleeding at high marking material coverage edges on an ink jet print, is to place a white space, which is herein defined as an area with no marking material coverage, between differently colored regions. The marking material will still bleed, but will only travel partially across the white space. Thus separation of colors will occur.

It will no doubt be appreciated however, that providing white spaces throughout an image would generate unsightly image artifacts. Thus, it is important to determine how wide the white space needs to be to accomplish the requirement of separating edges, and to make the white space no larger than necessary. Of course, it will be clear that the width of the white space is proportional to the amount of marking material in the regions adjacent to the white space.

These and other aspects of the invention will become apparent from the following descriptions to illustrate a preferred embodiment of the invention read in conjunction with the accompanying drawings in which:

FIGS. 1A, 1B, and 1C show the principle of the present invention, where

Figure 1A:
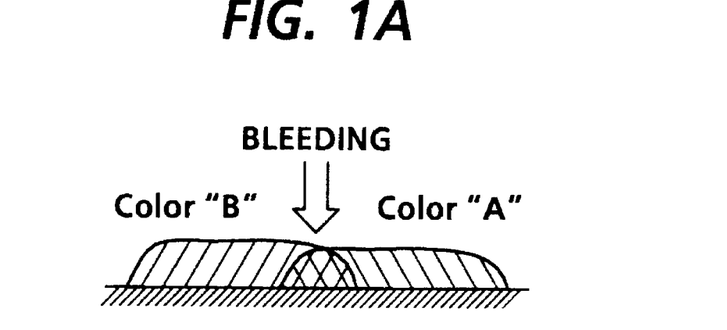
FIG. 1A shows bleeding occurring at an edge.
Figure 1B:
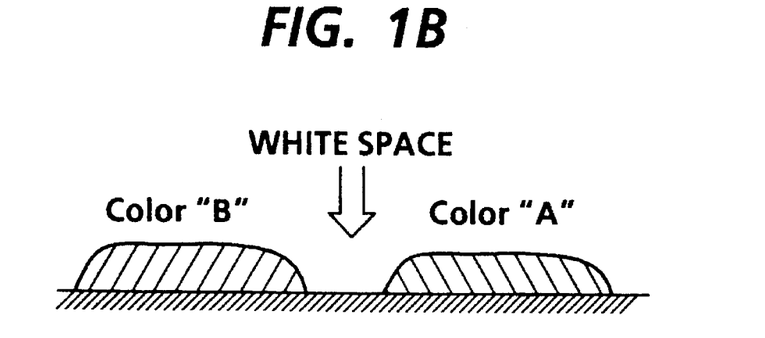
FIG. 1B shows the use of white space to separate colors at edges.
Figure 1C:
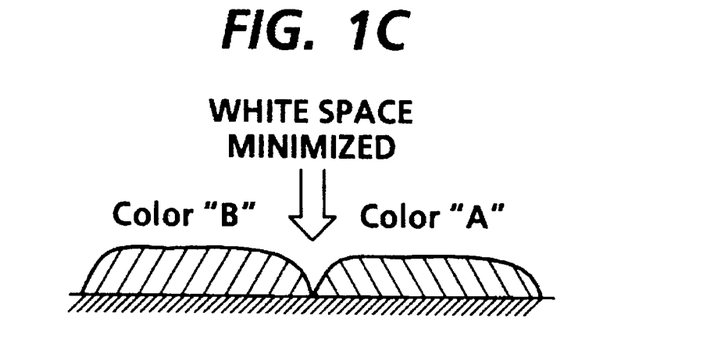
FIG. 1C shows white space minimized.
Figure 2A:
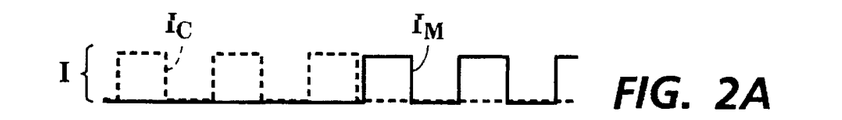
FIGS. 2A–F graphically illustrate the principle of the present invention.

Referring now to the drawings where the showings are for the purpose of describing the preferred embodiment of the invention and not for limiting same, initially, the principle of the present invention will be described, followed by a description of a preferred embodiment of the invention. With reference to FIG. 2A, a pair of signals $I_C$ and $I_M$ each representing a separation in color image I are illustrated. It will be noted that, as an example an edge in the image is illustrated by the abrupt beginning of $I_M$ and the abrupt end of $I_C$. In an image this would be reproduced by ink in a scan line abruptly turning from cyan to magenta, a situation with the potential for intercolor bleeding. Of course, it is likely that additional colored inks will be superposed over the cyan and magenta forming different colors, but the example remains valid.

Figure 2B:
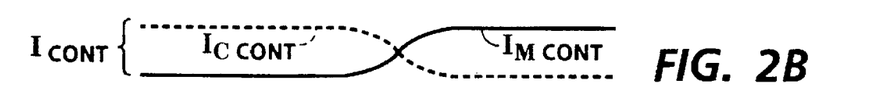
Figure 2C:
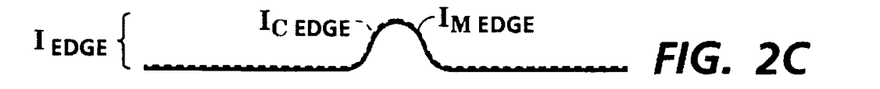

As shown in FIG. 2B, the signals $I_C$ and $I_M$ are processed to produce pseudo continuous tone signals $I_{CCONT}$ and $I_{MCONT}$. This step is used to simplify the process for finding true edges, and may not be necessary to the edge detection process (i.e., edges may be detected in the halftone images original input to the system). As illustrated, edges become apparent for each of $I_C$ and $T_M$. In FIG. 2C, edges are detected in $I_{CCONT}$ and $I_{MCONT}$ and edge signals $I_{CEDGE}$ and $I_{MEDGE}$ are formed indicating where the edges occur. It will be assumed for the sake of this example that edge reduction is required, although, as will become apparent in the system description, this is not always true.

Figure 2D:
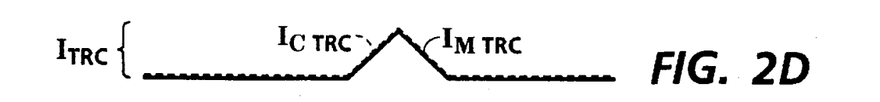
Figure 2E:
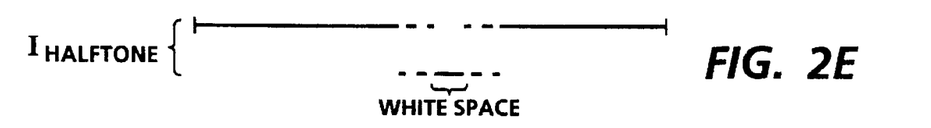
Figure 2F:
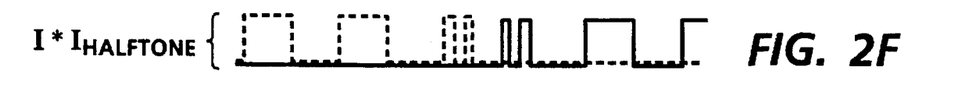

In FIG. 2D, signals $I_{CEDGE}$ and $I_{MEDGE}$ are adjusted by applying a predetermined TRC function to the edge signals, generated $I_{CTRC}$ and $I_{MTRC}$. In FIG. 2E, the linearized signals are binarized by a halftoning method to produce $I_{CCR}$ and $I_{MCR}$. These signals now represent a mask to be applied to IC or IM, respectively. The result, as seen in FIG. 2F is a white space between the two edges, which will vary dependent on the TRC selected and the area coverage at the edge.

Figure 3:
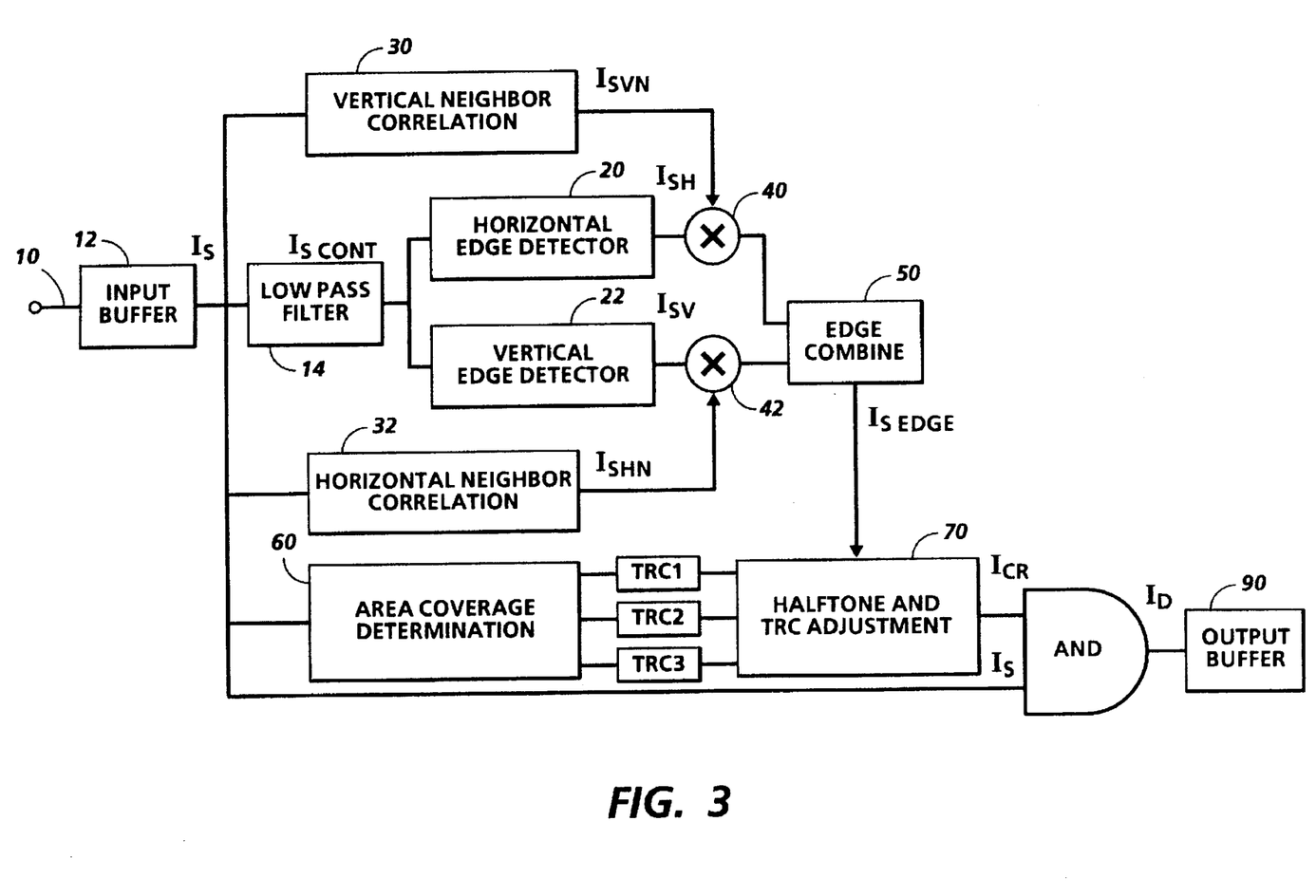
FIG. 3 is a block diagram of a system determining areas of excessive marking material coverage at image edges in a color image.

A basic functional block diagram for excessive coverage detection is shown in FIG. 3. A video input 10 representing one of the cyan, magenta, yellow or black separations ($I_S(m,n)$) of color image I(x,y) is directed into the edge coverage reduction system, which would be part of a somewhat standard ink jet printing system, as exemplified by U.S. Pat. No. 4,638,337 to Torpey et al. and U.S. Pat. No. 4,774,530 to Hawkins. Separation bitmaps $I_S(m,n)$ are typically binary bitmaps in this system, defined along fast and slow scan axes, describing the image for one separation in terms of 1 bit pixels arrayed in scan lines. Each pixel is an image signal, which may be said to have a condition or image state, which describes for a binary pixel whether a print dot will be made at the output or not. This may also be equated to whether the pixel is ON or OFF, 1 or 0. Thus, there are two image states for any pixel in a binary printer. For a multilevel printer, there may be more than two pixel values, and a similarly larger number of pixel image states. A color pixel, as used herein, is the pixel representing the sum of separation colors. A separation pixel is the corresponding pixel in a single separation.

At FIG. 3, a source of image signals, such as a scanner or a computer image generator (not shown), produces image separation signals $I_S(m,n)$ at a video input 10, typically to be stored at a multiscan line input buffer 12. Signals from input buffer 12 are directed to low pass filter 14. Low pass filter 14 could conveniently be an averaging filter operating on signals representing a 3×3 window of pixels (larger or smaller windows are possible) surrounding a pixel to be processed, to process the image so that it is approximately continuous tone (contone), $I_{SCONT}$, perhaps at 8 bits per pixel compared to a binary bitmap 1 bit per pixel. Contone signals $I_{SCONT}$ are directed to edge filter/detectors 20, 22 which respectively produce responses $I_H$ and $I_V$, indicative of the presence of an vertical or horizontal edge in the stream of image data, thereby forming an edge mapping of the image. One possible horizontal edge detection filter takes the form of:

| | | |
|---|---|---|
| 1 | 3 | 1 |
| 0 | 0 | 0 |
| −1 | −3 | −1 |

The vertical edge detection filter may conveniently use the same filter, 90° rotated.

Signals from input buffer 12 are also directed to vertical neighbor correlation 30 and horizontal neighbor correlation 32, which provide an indication of whether an edge is one occurring between two colors or the same color, or white space. In a preferred embodiment, an edge formed between two colors having the same chrominance but different luminances is not processed, and an edge formed between any color and white space is not processed. It will no doubt be appreciated that they could be.

Figure 4:
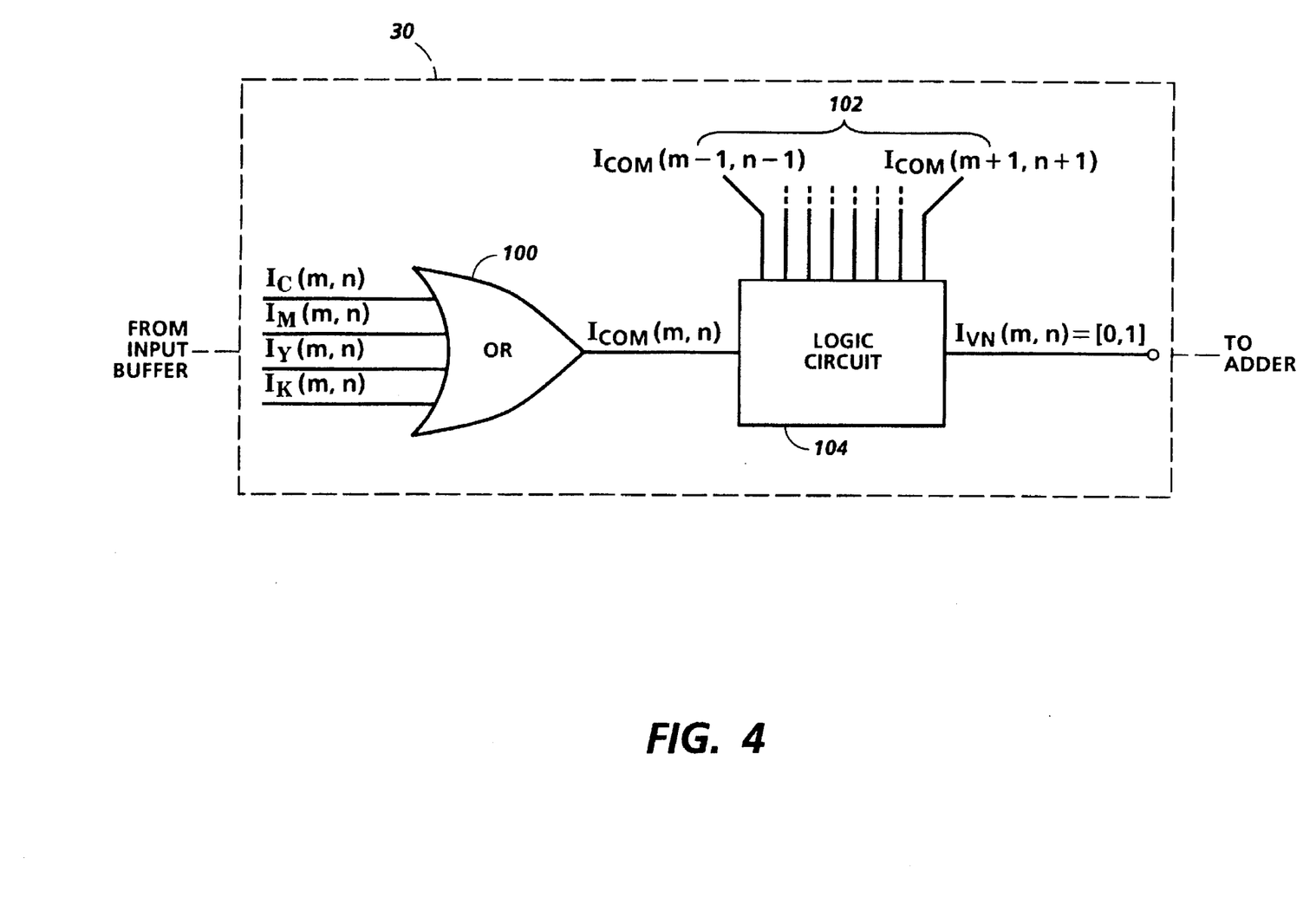
FIG. 4 is a block diagram of the neighbor correlation device determining the nature of any edge in the image.
Figure 5:
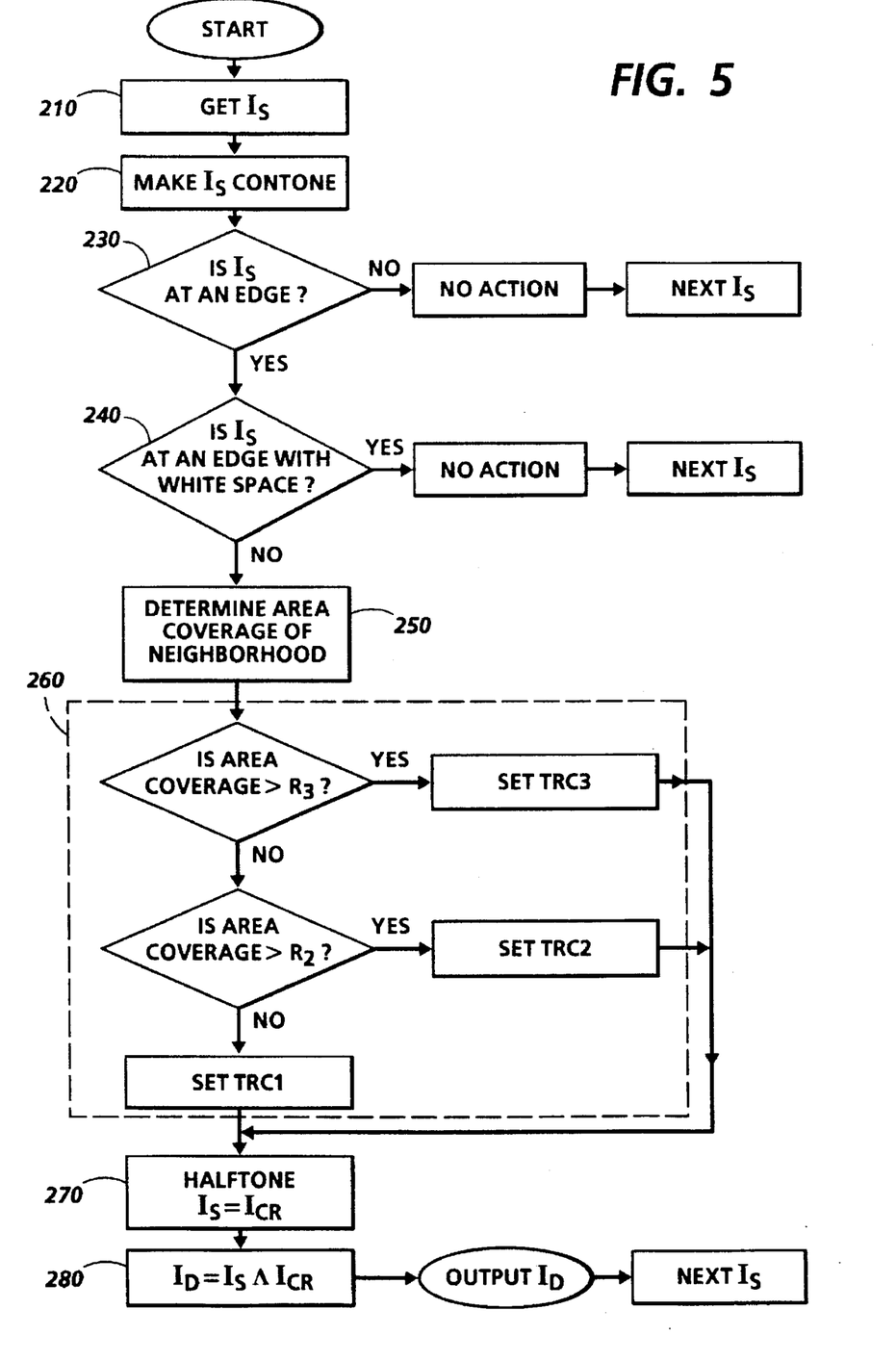
FIG. 5 is a flow chart of the described invention.

Referring now to FIG. 4, horizontal neighbor correlation 32 includes OR gate 100, logically ORing separation signals $I_C$, $I_M$, $I_Y$, and $I_K$ for each color pixel m,n together, producing a binary signal $I_{COM}$ which indicates whether or not there will be coverage at a color pixel in image I. A network of such OR gates (not shown), processes a window of color pixels, perhaps 3×3 pixels in size (larger or smaller windows are possible), and through inputs 102, direct the combined signal $[I_{COM}(m-1,n-1) \ldots I_{COM}(m+1,n+1)]$ to logic circuit 104. Logic circuit 104 operates on the window to produce a binary 1 signal whenever coverage is indicated in the center pixel of the window, in two diagonal neighbors (relative to the center pixel), and both horizontal neighbors (again, relative to the center pixel). Vertical neighbor correlation 30 is similarly constructed and operable, except that the corresponding logic circuit operates on the window to produce a binary 1 signal whenever a coverage is indicated in the center pixel of the window, in two diagonal neighbors (relative to the center pixel), and both vertical neighbors (to the center pixel). Otherwise, the signal is set to 0.

With reference again to FIG. 2, at multipliers 40, 42, the neighbor correlation response signals $I_{VN}$ and $I_{HN}$ from vertical and horizontal neighbor correlation 30, 32 and the edge mapping response signals $I_H$ and $I_V$ from horizontal and vertical edge detection 20, 22 are multiplied, so that the edge detection signals $I_H'$ and $I_V'$ indicate an edge only between two colors. Otherwise, the edge detection signal is multiplied by a 0 from the neighbor correlation circuits. The vertical and horizontal edge detection signals $I_H'$ and $I_V'$ are combined into a single mapping $I_{EDGE}$ at combiner 50.

An area coverage determination is made at area coverage determination 60, where the number of pixels over a given area is measured, once again perhaps over a 3×3 window surrounding the pixel to be processed, in order to determine whether the image region surrounding the pixel has high intensity (e.g., near 200% or above), mid-range (around 150%) intensity or low intensity (near or below 100%). Three intensity ranges have been selected as desirable for the purposes of the present implementation, although greater and lesser numbers of ranges may have value. The output of area coverage determination 60 selects one of three possible TRCs (tone reproduction curves) to use in reproduction of the pixel. Depending on the range in which area coverage falls, one of three TRCs is applied. The TRCs may be piecewise quadratics, empirically obtained by printing primary against primary, primary against secondary, and secondary against secondary, for a number of coverage levels at edges. Commonly, TRCs are stored in the form of lookup tables stored in a memory device, mapping input values-, to TRC adjusted output values.

When a single scan line of the edge buffer $I_{edge}(m, 1 \ldots n)$ has been computed, each $I_{edge}(m, 1 \ldots n)$ for each separation is halftoned at halftone processor 70 using four different dispersed dots screens, yielding a color image with zeros or white space where there was a large edge signal, indicating that cover reduction is required. For each separation $I_{CR}$ is produced and ANDed or masked against the image signal $I_S$, to turn off bits from input buffer 12 for printing, producing signals $I_o$ to output buffer 90.

In summary, the preferred method of operation is illustrated with the flow chart of FIG. 4. For a given pixel in $I_S$ (step 210), a pseudo continuous tone image $I_{SCONT}$ (step 220) is generated. From this continuous tone or contone image, at step 230, a determination is made as to whether $I_{SCONT}(m,n)$ is at an edge. If not, 232, no action is taken (indicated by "step" 232), and at step 234, the next $I_S(m,n)$ is obtained. If at step 230, $I_S(m,n)$ is determined to be at an edge, then at step 240, a determination is made as to whether $I_S(m,n)$ is at an edge with a white region or the same color region. If it is, no action is taken (indicated by "step" 242)

and at step 244, the next $I_s(m,n)$ is obtained. Otherwise, the pixel is determined to be at an edge where coverage reduction will be applied.

At step 250, area coverage or local intensity in a neighborhood surrounding pixel $I_s(m,n)$ is evaluated and at step 260, the determined area coverage value is evaluated to determine a range into which determined intensity falls. The range determination evaluates whether TRC1, TRC2 or TRC3 should be used in coverage reduction processing. At step 265, the TRC of $I_s$ is processed, applying coverage reduction. At step 270, the Is(m,n) is halftoned processed.

It will no doubt be appreciated that the present invention can be accomplished through application software accomplishing the functions, though a hardware circuit, which will probably provide optimum speed, or through some combination of software and hardware.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A method for processing a color document image prepared for printing on an ink jet printer, to reduce an amount of marking material used to reproduce image edge regions therein on a receiving medium, the color document image comprised of multiple separations each defined by an input image including image signals arranged in an array of scan lines, including the steps of:

receiving electronic binary signals forming a single separation of the input image, in which the binary signals are suitable for driving an ink jet printer to deposit a single color of ink on a receiving medium, wherein a number of binary signals having a first binary state cause the ink jet printer to deposit the single color of ink on the receiving medium and signals having a second binary state cause the ink jet printer not to deposit the single color of ink on the receiving medium;

processing the binary signals to form a multibit signal therefrom approximating a continuous tone image;

operating on the multibit signals to detect edges, and generating an edge detection signal indicating locations thereof in the input image;

at locations indicated as edges in the edge detection signal, processing the binary signals forming the input image to reduce the number of first binary state signals in the input image in regions therein adjacent to edges corresponding to the signal.

2. The method as described with respect to claim 1, wherein the receiving medium is a transparency sheet.

3. The method as described with respect to claim 1, wherein the color document image includes at least three separations.

4. The method as described with respect to claim 1, wherein the step of processing the binary signals to form a multibit signal therefrom approximating a continuous tone image, operates on a plurality of binary signals to average the binary signals over a small area of the image.

5. The method as described in claim 4, wherein for each binary image signal, a corresponding continuous tone image multibit signal is generated, by averaging binary image signals in a 3×3 neighborhood surrounding the binary image signal for which a continuous tone image multibit signal is to be generated.

6. The method as described in claim 1, wherein the step of processing the binary signals forming the input image to reduce the number of first binary signals in the input image in regions therein adjacent to edges corresponding to the edge mapping signal includes:

measuring ink coverage in the region adjacent to the edge;

selecting an amount of reduction of the corresponding number of first binary signals in regions adjacent to edges in the input image by an amount related to the ink coverage.

7. A method for processing a color document image for printing, to reduce an amount of marking material used to reproduce image edge regions therein on a receiving medium, the color document image comprised of multiple separations each defined by an input image including image signals arranged in an array of scan lines, including the steps of:

receiving electronic binary signals forming a multiple separation of the input image, in which the binary signals are suitable for driving an ink jet printer to deposit a separation colors of ink on a receiving medium, wherein a number of binary signals having a first binary state cause the ink jet printer to deposit the separation color of ink on the receiving medium and signals having a second binary state cause the ink jet printer not to deposit the separation color of ink on the receiving medium;

processing the binary signals to form a multibit signal therefrom approximating a continuous tone image;

processing the multibit signal to detect edges, and generating an edge detection signal indicating locations of image edges in the input image;

processing the binary signals from the multiple separations to determine, within an image whether coverage reduction at a detected edge is required, and producing a separation correlation signal therefrom;

logically combining the edge detection signals and the separation correlation signals, to produce a corrected edge detection signals, indicating those edges at which coverage reduction will occur;

at locations indicated as edges in corrected edge detection signal, processing the binary signals forming the input image to reduce the number of first binary signals in the input image in regions therein adjacent to edges corresponding to the edge detection signal.

8. The method as described with respect to claim 7, wherein the receiving medium is a transparency sheet.

9. The method as described with respect to claim 7, wherein the color document image includes at least three separations.

10. The method as described with respect to claim 7, wherein the step of processing the binary signals to form a multibit signal therefrom approximating a continuous tone image, operates on a plurality of binary signals to average the binary signals over a small area of the image.

11. The method as described in claim 10, wherein for each binary image signal, a corresponding continuous tone image multibit signal is generated, by averaging binary image signals in a 3×3 neighborhood surrounding the binary image signal for which a continuous tone image multibit signal is to be generated.

12. The method as described in claim 7, wherein the step of processing the binary signals from the multiple separations to determine, within an image whether coverage reduction at a detected edge is required, and producing a separation correlation signal therefrom includes:

identifying a given area in the color document image;

determining whether binary signals having a first state are present in at least one separation in at least a preselected set of locations within said given area;

producing said separation correlation signal responsive to said determining of whether binary signals having a first state are present in at least one separation in at least a preselected set of locations within said given area.

13. An image processing device for processing a color document image for printing with an ink jet printer, to reduce an amount of marking material used to reproduce image edge regions therein on a receiving medium, the color document image comprised of multiple separations each defined by an input image including image signals arranged in an array of scan lines, including:

a signal input, receiving electronic binary signals forming a multiple separation of the input image, in which the binary signals are suitable for driving an ink jet printer to deposit a separation color of ink on a receiving medium, wherein a number of binary signals having a first binary state cause the ink jet printer to deposit the separation color of ink on the receiving medium and signals having a second binary state cause the ink jet printer not to deposit the separation color of ink on the receiving medium;

a first filter, processing the received binary signals to form a multibit signal therefrom approximating a continuous tone image;

an edge detecting circuit processing the multibit signal to detect edges, and generating an edge detection signal indicating locations of image edges in the input image;

a separation correlation circuit processing received binary signals from the multiple separations to determine, within an image whether coverage reduction at a detected edge is required, and producing a separation correlation signal therefrom;

a combining circuit, receiving as inputs the edge detection signal and the separation correlation circuit and combining said inputs to generate a corrected edge detection signal, indicating those edges at which coverage reduction will occur;

an average measurement circuit, measuring coverage within a given area of the color document image and producing a value representative thereof;

a tone reproduction curve processor, providing a lookup table in memory, and receiving as an input the binary signal value and the measured coverage value, and producing as an output a tone reproduction curve corrected signal;

a masking arrangement, having as inputs the tone reproduction curve corrected signal and the corrected edge detection signal, and operable to mask the tone reproduction curve corrected signal with the correction edge detection signal to produce coverage reduced binary signals responsive thereto;

a processed image output, directing the coverage reduced binary signals to an ink jet printer.

14. The device as described with respect to claim 13, wherein the receiving medium is a transparency sheet.

15. The device as described with respect to claim 13, wherein the color document image includes at least three separations.

* * * * *